(12) United States Patent
Tanno

(10) Patent No.: US 8,136,560 B2
(45) Date of Patent: Mar. 20, 2012

(54) TIRE NOISE REDUCTION DEVICE

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 373 days.

(21) Appl. No.: 12/431,603

(22) Filed: Apr. 28, 2009

(65) Prior Publication Data

US 2009/0277549 A1    Nov. 12, 2009

(30) Foreign Application Priority Data

May 9, 2008    (JP) .................................. 2008-124015
Apr. 6, 2009   (JP) .................................. 2009-091942

(51) Int. Cl.
    *B60C 5/00*      (2006.01)
    *B60C 19/00*     (2006.01)

(52) U.S. Cl. .......................... 152/155; 152/157; 152/158

(58) Field of Classification Search .................. 152/155, 152/157, 450, 158, 159
    See application file for complete search history.

(56) References Cited

U.S. PATENT DOCUMENTS

| 1,401,610 A | * | 12/1921 | Kuhn ............................. 152/157 |
| 2003/0020320 A1 | * | 1/2003 | Yukawa et al. ............... 301/6.91 |
| 2006/0108042 A1 | * | 5/2006 | Yukawa et al. ............... 152/450 |
| 2006/0157180 A1 | * | 7/2006 | Tanno et al. ................... 152/450 |
| 2008/0099116 A1 | * | 5/2008 | Tanno ............................ 152/454 |

FOREIGN PATENT DOCUMENTS

| JP | A 2006-224928 | 8/2006 |
| JP | A 2007-237962 | 9/2007 |
| WO | WO 2005/012007 A1 | 2/2005 |
| WO | WO 2006/088000 A1 | 8/2006 |

* cited by examiner

*Primary Examiner* — Katarzyna Wyrozebski Lee
*Assistant Examiner* — Scott W Dodds
(74) *Attorney, Agent, or Firm* — Greer, Burns & Crain Ltd.

(57) ABSTRACT

A tire noise reduction device includes at least one noise absorbing member made of a porous material. The noise absorbing member is attached to the inner surface of the tire tread portion. The noise absorbing member includes multiple continuous grooves arranged side by side in a tire circumferential direction in the outer peripheral surface of the noise absorbing member. Each of the continuous grooves has an areal groove bottom and forms see-through regions in the width direction of the noise absorbing member. A groove edge-to-edge distance between each adjacent two of the continuous grooves in the tire circumferential direction is 2 mm to 40 mm. A largest see-through cross-sectional area of each continuous groove is 20 mm$^2$ to 100 mm$^2$.

18 Claims, 9 Drawing Sheets

TIRE NOISE REDUCTION DEVICE

BACKGROUND OF THE INVENTION

1. Field of the Invention

The present invention relates to a tire noise reduction device. More specifically, the present invention relates to a tire noise reduction device which allows rapid and reliable tire sealing when a pneumatic tire runs over a nail or the like and is punctured, without deteriorating the durability of a noise absorbing member attached to the inner surface of a tread portion of the tire.

2. Description of the Related Art

A resonance sound is generated in a pneumatic tire due to the vibration of the air in a tire cavity during running. This cavity resonance sound is known to make a vehicle occupant uncomfortable when transmitted into the vehicle compartment. Conventionally, in order to reduce such a cavity resonance noise generated in the tire cavity portion, it is known to dispose a noise absorbing member made of a porous material on the inner surface of a tread portion (see, for example, International Publication Nos. WO2005/012007 and WO2006/088000 and Japanese patent application Kokai publication Nos. 2006-224928 and 2007-237962).

Meanwhile, there is a tire sealing method for a case where a tire having run over a nail or the like during running is punctured with a through hole formed by the nail or the like in the tread portion. In the method, a liquid tire sealant is poured through an air injection valve and caused to flow into the through hole by the air pressure. Thereby, the through hole is sealed.

However, the aforementioned tire that has the noise absorbing member disposed on the inner surface of the tread portion has a problem that the tire sealing operation cannot be performed smoothly even when a liquid tire sealant 6 is poured into a cavity of a tire 3 as shown in FIG. 18. This is because a noise absorbing member 2 hinders the liquid tire sealant 6 from entering a through hole (A) formed by a nail (B) piercing through a tread portion 4. Particularly, in a case where the tip end of the nail (B) does not pierce through an inner peripheral surface 2y of the noise absorbing member 2 as shown in FIG. 18 or where the liquid tire sealant 6 does not reach the inner peripheral surface 2y of the noise absorbing member 2 even if the nail (B) does pierce therethrough, the liquid tire sealant 6 cannot flow into the through hole (A) readily. This makes the operation of sealing a hole of the punctured tire more time-consuming.

Moreover, an air injection valve provided on a rim is located generally on the outer side of the vehicle when the pneumatic tire is mounted on the vehicle. For this reason, in the tire having a noise absorbing member 2 that is disposed around the inner peripheral surface of the tire, a liquid tire sealant 6 poured therein through an air injection valve is likely to be present mostly on the outer side of the noise absorbing member 2 when the pneumatic tire is mounted on the vehicle. Accordingly, when a through hole (A) is formed in the tire on the inner side of the vehicle with respect to the noise absorbing member 2 when the pneumatic tire is mounted on the vehicle, the noise absorbing member 2 blocks the flow of the liquid tire sealant 6. Eventually, no liquid tire sealant 6 flows into the through hole (A).

SUMMARY OF THE INVENTION

An object of the present invention is to provide a tire noise reduction device which allows rapid and reliable tire sealing when the tire runs over a nail or the like and is punctured, without deteriorating the durability of a noise absorbing member attached to the inner surface of a tread portion of a pneumatic tire.

The tire noise reduction device of the present invention for achieving the above object is characterized as follows. Specifically, the tire noise reduction device includes at least one noise absorbing member which is made of a porous material and attached to an inner surface of a tire tread portion. The noise absorbing member includes multiple continuous grooves arranged side by side in a tire circumferential direction in an outer peripheral surface of the noise absorbing member. Each of the continuous grooves has an areal groove bottom and extends from one side surface to an opposite side surface of the noise absorbing member in a tire width direction so that one side can be seen through the continuous groove from the opposite side. A groove edge-to-edge distance between each adjacent two of the continuous grooves in the tire circumferential direction is 2 mm to 40 mm. A largest see-through cross-sectional area of each of the continuous grooves is 20 mm$^2$ to 100 mm$^2$.

Moreover, the tire noise reduction device of the present invention is preferably structured as described in (1) to (8) below.

(1) Water repellent finishing is performed on at least the outer peripheral surface of the noise absorbing member.

(2) The noise absorbing member has an apparent density of 5 kg/m$^3$ to 30 kg/m$^3$.

(3) The continuous groove has a depth of 1 mm to 10 mm.

(4) The continuous groove has a width of 2 mm to 30 mm.

(5) A see-through-region extending direction specified by the largest see-through cross-sectional area of the continuous groove is inclined at 0° to 30° to the tire width direction.

(6) Other continuous grooves are formed to cross the continuous grooves, and the continuous grooves and the other continuous grooves define block-form land portions. In this case, the other continuous grooves should extend substantially in the tire circumferential direction. Moreover, the number of the block-form land portions should be 400/m$^2$ to 80000/m$^2$.

(7) The area where the outer peripheral surface of the noise absorbing member is in contact with the inner surface of the tread portion is 20% to 90% of a projected area of the noise absorbing member that is projected in a tire radial direction.

(8) An annular elastic band is attached to the noise absorbing member for attaching the noise absorbing member to the inner surface of the tire tread portion. In this case, the noise absorbing member should include multiple divided parts, the divided parts being arranged apart from one another at certain intervals in the tire circumferential direction.

Furthermore, a pneumatic tire of the present invention includes the above-described tire noise reduction device mounted on the inner surface of the tread portion. As a mounting method, the tire noise reduction device may be bonded to the inner surface of the tread portion by the elastic force of the tire noise reduction device or by the elastic force of an annular elastic band used therefor. Alternatively, an adhesive may be used to attach the two to each other.

In the above-described tire noise reduction device of the present invention, the multiple continuous grooves, which are extending see-through regions, are arranged side by side in the tire circumferential direction in the outer peripheral surface of the noise absorbing member. The groove edge-to-edge distance between each adjacent two of the continuous grooves in the tire circumferential direction is set to 2 mm to 40 mm. The largest see-through cross-sectional area of each continuous groove is set to 20 mm$^2$ to 100 mm$^2$. Thereby, these continuous grooves traverse the noise absorbing member in the width direction between the outer peripheral surface of the noise absorbing member and the inner surface of the tire tread portion inner surface. Additionally, continuous spaces are formed at short intervals in the tire circumferential direction. Thus, wherever a through hole is formed in the tread portion, a liquid tire sealant poured through an air injection valve is smoothly guided into and seals the through hole. Moreover, each continuous groove has the areal groove bottom. Accordingly, even when the noise absorbing member is repeatedly flexed, a stress is not concentrated on the groove bottom of the continuous groove. Thus, the durability of the noise absorbing member is retained.

DESCRIPTION OF THE PREFERRED EMBODIMENTS

Hereinafter, embodiments of the present invention will be described in detail with reference to the accompanying drawings.

Figure 1:
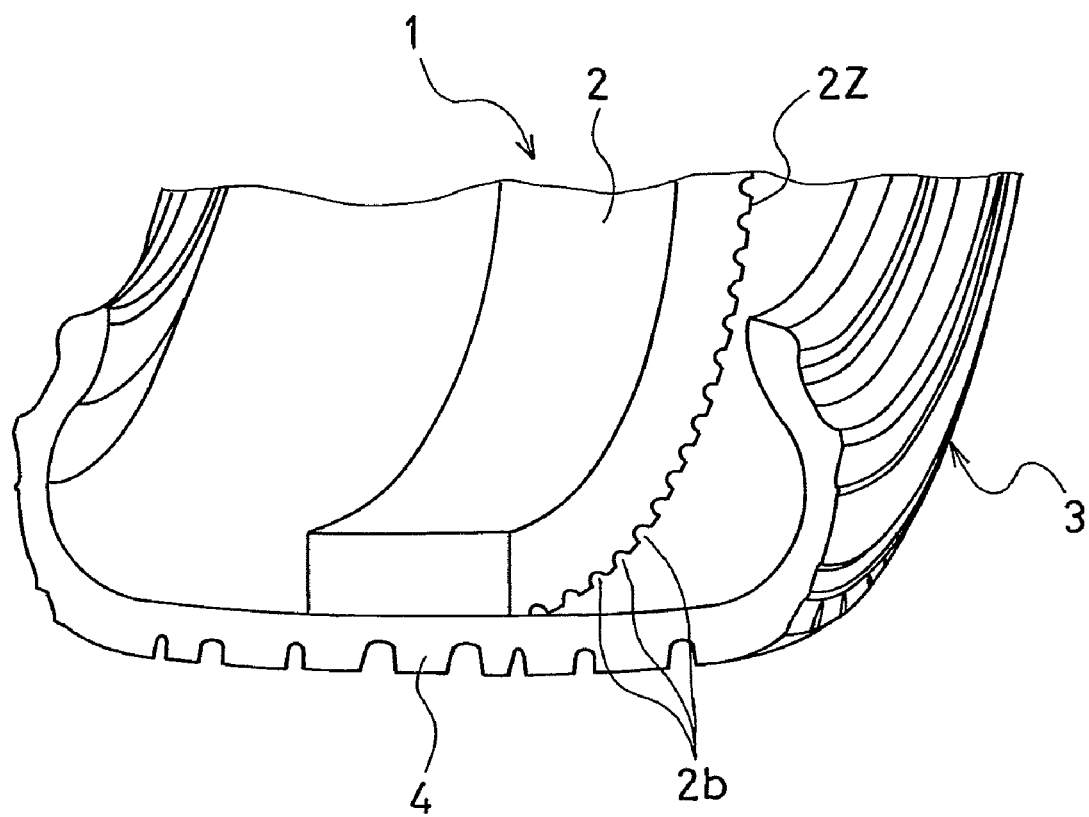
FIG. 1 is a partial perspective view showing a cross section of a principal portion of a pneumatic tire on which a tire noise reduction device according to an embodiment of the present invention is mounted.

In FIG. 1, a tire noise reduction device 1 of the present invention is formed of at least one noise absorbing member 2 that is made of a porous material with an annular form. The tire noise reduction device 1 is mounted on the inner surface of a tread portion 4 of a pneumatic tire 3. In the tire noise reduction device 1, multiple continuous grooves 2b are arranged side by side in a tire circumferential direction in an outer peripheral surface 2Z of the noise absorbing member 2. Each of the continuous grooves 2b extends from one side surface of the noise absorbing member to an opposite side surface thereof in a tire width direction so that the one side can be seen through the continuous groove from the opposite side. The continuous groove 2b has an areal groove bottom. These continuous grooves 2b need to be formed so that a groove edge-to-edge distance between each adjacent two of the continuous grooves 2b in the tire circumferential direction is 2 mm to 40 mm, and so that a largest see-through cross-sectional area of each continuous groove 2b is 20 mm$^2$ to 100 mm$^2$.

Conventionally, the following are proposed as a noise absorbing member: one formed by connecting multiple porous members (WO2006/088000); and one having notches formed in the outer peripheral surface of the noise absorbing member (WO2005/012007). Among these, the noise absorbing member of WO2006/088000 has a space formed between the adjacent porous members, allowing a tire sealer to flow through the space. However, while the tire is running, the noise absorbing member is deformed repeatedly, and the adjacent porous members come into contact with each other. As a result, the noise absorbing member is likely to be damaged, and the durability thereof may be decreased. Meanwhile, in the noise absorbing member of WO2005/012007, the notches are formed in the outer peripheral surface of the noise absorbing member. Accordingly, a stress is likely to be concentrated around the tip of the notch, and the durability of this noise absorbing member may be decreased, as well.

On the other hand, the noise absorbing member of the present invention includes the continuous grooves 2b each of which has the areal groove bottom. Accordingly, even when the noise absorbing member 2 is repeatedly flexed, a stress is not concentrated on the groove bottom of the continuous groove 2b. Thus, the durability of the noise absorbing member is maintained. Moreover, the groove edge-to-edge distance between each adjacent two of the continuous grooves 2b in the tire circumferential direction is set to 2 mm to 40 mm, and the largest see-through cross-sectional area of each continuous groove 2b is set to 20 mm$^2$ to 100 mm$^2$. Accordingly, spaces are continuously formed at short intervals between the outer peripheral surface of the noise absorbing member and the inner surface of the tire tread portion. Thereby, a liquid tire sealant poured through an air injection valve is likely to spread over the inner surface of the tread portion, and the liquid tire sealant can flow into a through hole (A) smoothly.

Figure 2:
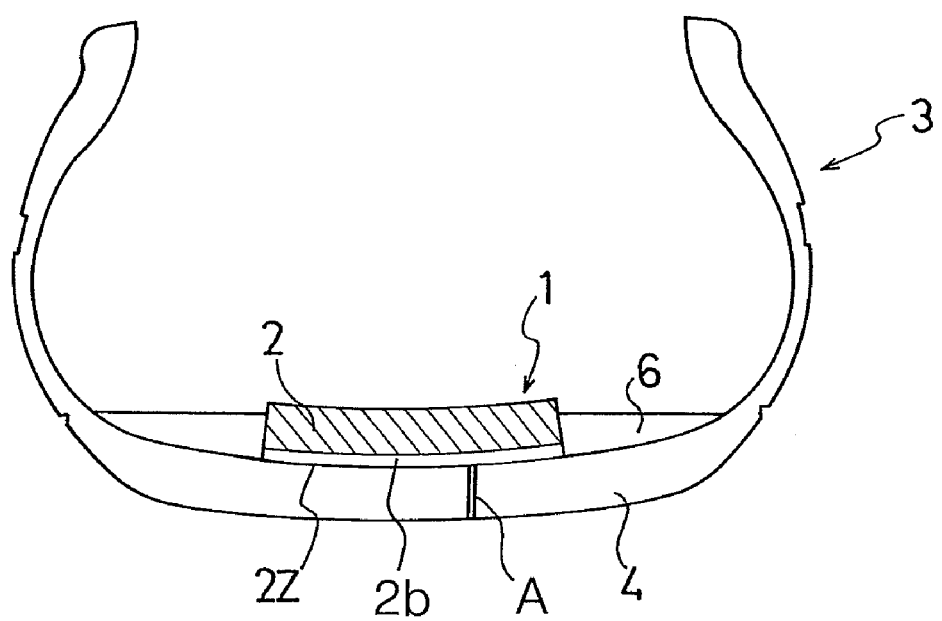
FIG. 2 is a cross-sectional view showing a state where a liquid tire sealant is poured into the pneumatic tire on which the tire noise reduction device according to the embodiment of the present invention is mounted.

FIG. 2 is a cross-sectional view showing an overview where a liquid tire sealant 6 is poured through an air injection valve onto the inner surface of the tread portion 4 on which the tire noise reduction device is mounted. Although the liquid tire sealant 6 thus poured stays on the side of a contact region, the liquid tire sealant 6 spreads toward the tire circumferential direction by low-speed running at a certain distance or for a certain period. Moreover, the air pressure allows the liquid tire sealant 6 to readily flow into the continuous grooves formed in the outer peripheral surface 2Z of the noise absorbing member 2, and to be distributed between the tread portion 4 and the noise absorbing member 2. Furthermore, the liquid tire sealant 6 moves across the noise absorbing member in the width direction, and flows into a region on the opposite side from the air injection valve. Thereby, wherever a through hole is formed in the tread portion by running over a nail or the like, the liquid tire sealant 6 poured through the air injection valve can be smoothly guided into and can seal the through hole (A).

Figure 3:
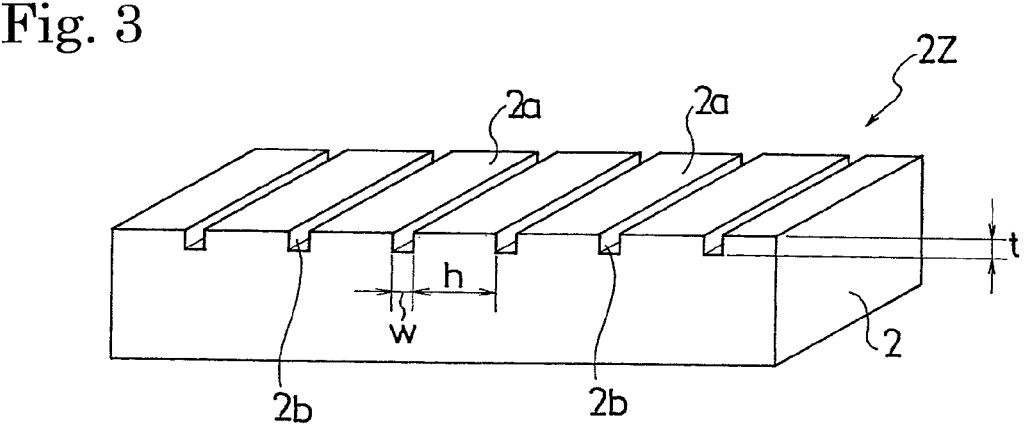
FIG. 3 is a perspective view showing a state where a portion of a noise absorbing member used for the tire noise reduction device according to the embodiment of the present invention is stretched into a planar form.

FIG. 3 shows one example of the noise absorbing member that forms the tire noise reduction device of the present invention. In the outer peripheral surface 2Z of the noise absorbing member 2, the multiple continuous grooves 2b each having a rectangular cross section are provided straightly so as to traverse the noise absorbing member in the tire width direction. Thus, land portions 2a are formed between the adjacent continuous grooves 2b. The land portions 2a come into contact with the inner surface of the tread portion 4. See-through regions are formed by the continuous grooves 2b in a width direction of the noise absorbing member 2. The largest cross-sectional area of each of the see-through regions is set within 20 mm$^2$ to 100 mm$^2$, and preferably 25 mm$^2$ to 50 mm$^2$. If the largest see-through cross-sectional area is less than 20 mm$^2$, it is difficult for a liquid tire sealant to flow into the continuous groove. Meanwhile, if the largest see-through cross-sectional area exceeds 100 mm$^2$, it is easy for a liquid tire sealant to flow into the continuous groove at the time of low-speed running after the liquid tire sealant is poured, but the liquid tire sealant is readily discharged instantaneously by tire-rolling motion. For this reason, the largest see-through cross-sectional area is set to be within the above-described range. Thereby, a liquid tire sealant is desirably held in the continuous grooves even during tire-rolling motion. Thus, the liquid tire sealant is rapidly distributed to a punctured portion of the tire. Note that, if the continuous groove 2b with the uniform cross-sectional area throughout traverses the noise absorbing member straightly, the largest see-through cross-sectional area is the same as the cross-sectional area of the continuous groove 2b.

Here, the formation of the continuous groove 2b as the see-through region means that one side of the noise absorbing member 2 can be seen straightly through the continuous groove 2b from the opposite side in the width direction vice versa. The direction in which the see-through region extends may be the tire width direction or a direction inclined to the tire width direction.

Figure 4:
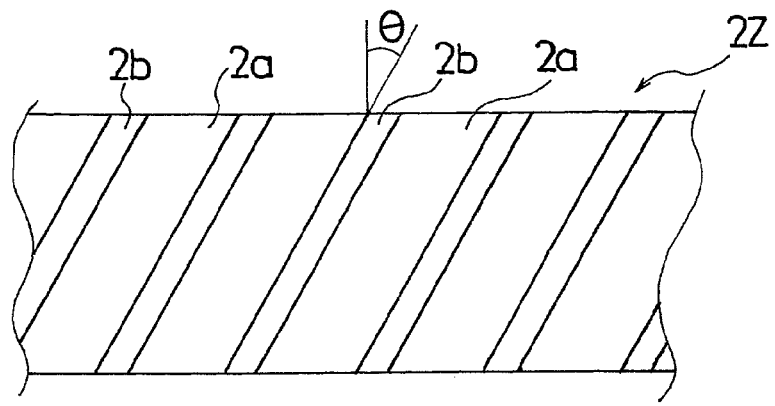
FIG. 4 is a plan view showing a state where a portion of a noise absorbing member used for a tire noise reduction device according to another embodiment of the present invention is stretched into a planar form.
Figure 5:
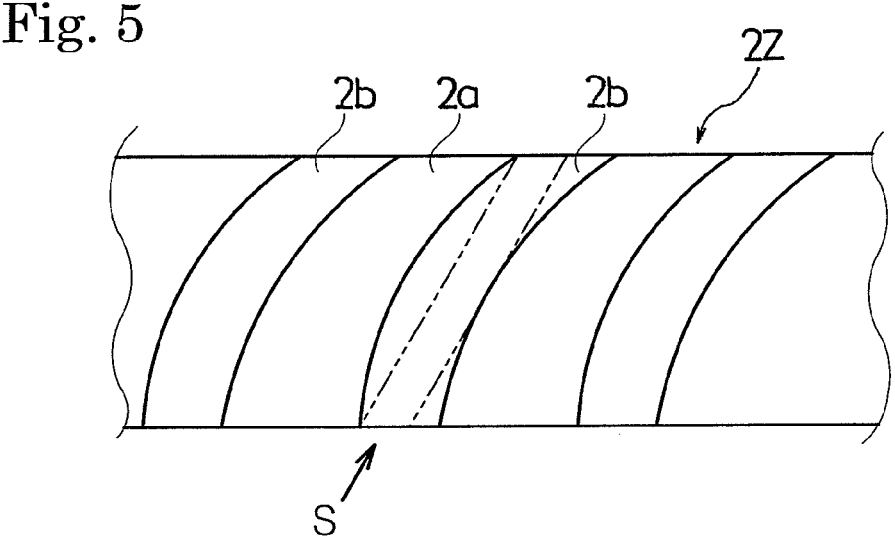
FIG. 5 is a plan view showing a noise absorbing member according to still another embodiment of the present invention, corresponding to FIG. 4.
Figure 6:
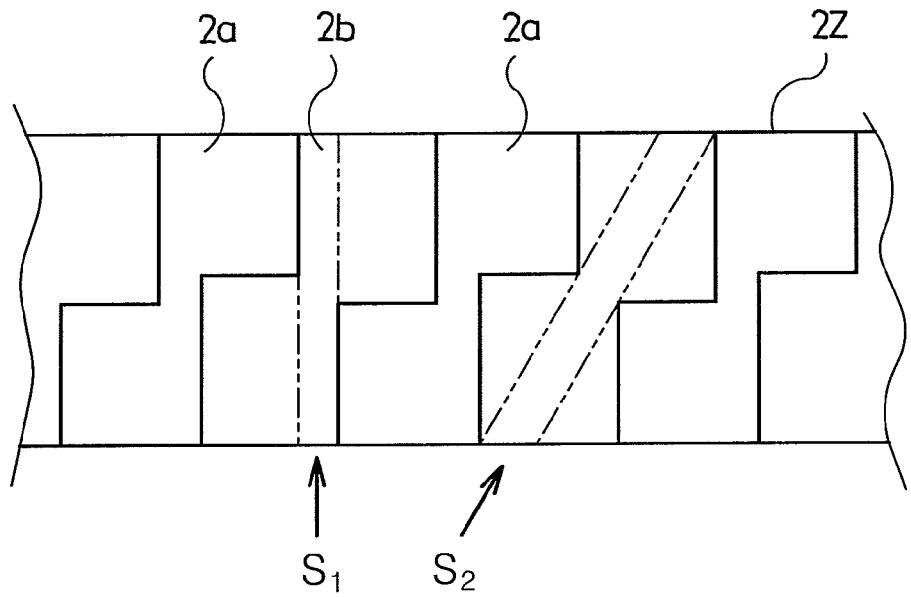
FIG. 6 is a plan view showing a noise absorbing member according to still another embodiment of the present invention, corresponding to FIG. 4.

FIGS. 4 to 6 show forms of continuous grooves 2b formed in the outer peripheral surface 2Z of the noise absorbing member 2. Multiple continuous grooves 2b in FIG. 4 are formed straightly but inclined to the tire width direction at an angle θ, traversing the noise absorbing member 2 by the uniform cross-sectional areas. The multiple continuous grooves 2b are arranged in parallel at equal intervals in the tire circumferential direction, and land portions 2a are formed between the adjacent continuous grooves 2b. Although continuous grooves 2b in FIG. 5 are formed into curved shapes, one side of the noise absorbing member can be seen straightly through the continuous groove from the opposite side as viewed in a direction indicated by an arrow S. In FIG. 5, the cross-sectional area perpendicular to a see-through-region extending direction in a see-through region between chain double-dashed lines is a see-through cross-sectional area. In this respect, by changing the direction of the arrow S, the see-through cross-sectional area also changes. For this reason, in the present invention, the largest see-through cross-sectional area is defined within the above-described range. Meanwhile, in FIG. 6, the groove widths of continuous grooves 2b are formed so as to vary from each other in the tire width direction. In the case of FIG. 6, see-through regions are formed in a number of directions as indicated by arrows $S_1$ and $S_2$. The cross-sectional areas perpendicular to the corresponding extending directions (arrows $S_1$ and $S_2$) are set as see-through cross-sectional areas. Among these see-through cross-sectional areas, the largest see-through cross-sectional area should be within the above-described range.

Figure 7:
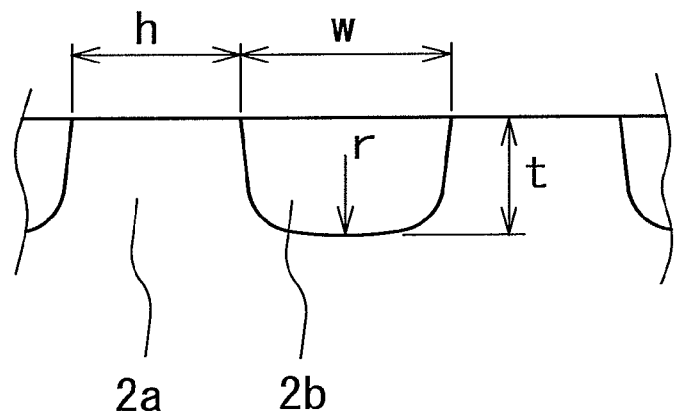
FIG. 7 is an enlarged side view showing a continuous groove portion of a noise absorbing member according to still another embodiment of the present invention.

The continuous grooves 2b need to have the areal groove bottoms. By forming the areal groove bottoms, the stress concentration at the time of repeated deformation is decreased, thus maintaining the durability of the noise absorbing member. Furthermore, even when buckling occurs in the contact region at the time of low-speed running after a liquid tire sealant is poured, the continuous grooves do not close, securing the continuous spaces in the width direction. Herein, the areal groove bottom may be flat or curved. As shown in FIG. 7, the continuous groove 2b should have the groove bottom with a curvature radius (r) of 2.0 mm or more in the cross section. If the curvature radius (r) is less than 2.0 mm, the stress concentration is likely to occur, decreasing the durability of the noise absorbing member. Moreover, the see-through cross-sectional area cannot be secured sufficiently. Incidentally, if the curvature radius (r) is infinite (∞), the groove bottom is flat. Meanwhile, examples of the cross-sectional shape of the continuous groove 2b include rectangle, trapezoid, U-shape, and the like.

A groove edge-to-edge distance (h) between each adjacent two of the continuous grooves 2b is 2 mm to 40 mm, and preferably 4 mm to 20 mm. If the groove edge-to-edge distance (h) is shorter than 2 mm, when the tire is mounted on a rim and an air is filled thereinto, the noise absorbing member 2 is compressed and deformed by the air pressure, crushing the land portions 2a. Accordingly, the continuous spaces cannot be formed. Moreover, the surface pressure on the land portions is increased, decreasing the durability. Meanwhile, if the groove edge-to-edge distance (h) exceeds 40 mm, the continuous spaces are not sufficiently formed in the outer peripheral surface of the noise absorbing member 2, making it difficult for a liquid tire sealant to spread over central regions of the land portions in the width direction. Note that the groove edge-to-edge distance (h) between the continuous grooves is a distance between both side edges of each land portion in a direction perpendicular to the central line of the land portion.

The continuous groove 2b preferably has a depth (t) of 1 mm to 10 mm, and more preferably 2.0 mm to 5.0 mm. If the depth (t) of the continuous groove is shallower than 1 mm, when the tire is mounted on a rim and an air is filled thereinto, the noise absorbing member 2 is compressed and deformed by the air pressure, eliminating the continuous grooves. Accordingly, the continuous spaces cannot be retained in the outer peripheral surface of the noise absorbing member 2. Meanwhile, if the depth (t) of the continuous groove exceeds 10 mm, the flexural rigidity of the noise absorbing member 2 is decreased, and the durability is worsened. Note that the depth (t) of the continuous groove is a depth from an edge portion of the continuous groove to the groove bottom.

The continuous groove 2b preferably has a width (w) of 2 mm to 30 mm, more preferably 3.0 mm to 15 mm, and further preferably 4.0 mm to 10 mm. If the width (w) of the continuous groove is narrower than 2 mm, the continuous spaces are not sufficiently formed in the outer peripheral surface of the noise absorbing member 2, and the continuous grooves are likely to close at the time of low-speed running. Meanwhile, if the width (w) of the continuous groove exceeds 30 mm, the continuous groove is deformed by the centrifugal force at the time of low-speed running, and the groove bottom is brought into contact with the inner surface of the tread portion. Accordingly, the continuous spaces cannot be retained. Note that the width (w) of the continuous groove is a distance between both side edges of the opening portion of the continuous groove in a direction perpendicular to the extending direction of the continuous groove.

In the present invention, the angle θ between the extending direction of the see-through region having the largest see-through cross-sectional area and the tire width direction in FIG. 4 is preferably 0° to 30°, and more preferably 0° to 27°. The angle θ formed within such a range allows shortening of the distance that the liquid tire sealant 6 flows through the noise absorbing member 2 from outside to inside when the pneumatic tire is mounted on the vehicle. Thereby, the problem that a liquid tire sealant poured through the air injection valve into the tire cavity is present mostly on the outer side of the noise absorbing member when the pneumatic tire is mounted on the vehicle is solved as quick as possible.

The area where the outer peripheral surface 2Z of the noise absorbing member 2 is in contact with the inner surface of the tread portion 4, which is the total area of the outer peripheral sides of the land portions 2a formed between each adjacent two of the continuous grooves 2b, 2b, is preferably 20% to 90% of the projected area of the noise absorbing member 2, more preferably 40% to 85%, and further preferably 50% to 80%. If the total area of the land portions 2a is smaller than 20%, the noise absorbing member cannot be attached stably and is likely to be damaged, decreasing the durability. Moreover, the compression rigidity cannot be sufficiently obtained. When the tire is mounted on a rim and an air is filled thereinto, the noise absorbing member 2 is compressed and deformed by the air pressure, and the land portions are likely to be crushed. Accordingly, the continuous spaces cannot be formed in the outer peripheral surface of the noise absorbing member 2 in the width direction, which disturbs the flow of the liquid tire sealant 6. Meanwhile, if the area of the land portions 2a exceeds 90%, the continuous spaces cannot be sufficiently retained, and the liquid tire sealant 6 cannot flow readily. Note that the projected area of the noise absorbing member is an area of the noise absorbing member projected onto the tread inner surface in a tire radial direction, while the noise absorbing member is being attached to the inner surface of the tread portion. Incidentally, when a number of the noise absorbing members are used, the projected area is the sum of all the projected areas thereof.

Figure 8:
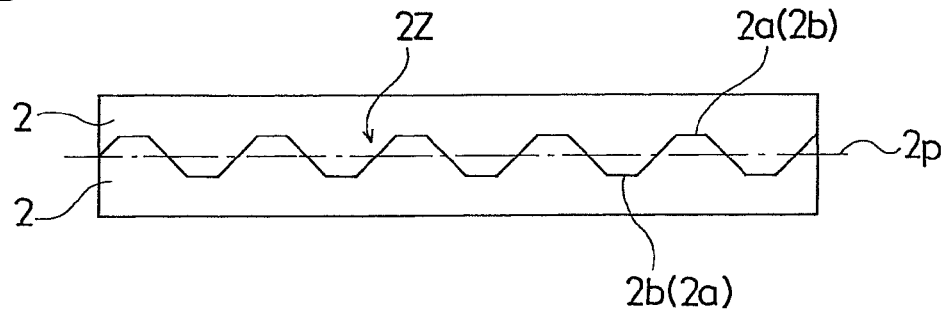
FIG. 8 is a side view for explaining an embodiment of a method for producing a noise absorbing member used in the present invention.

When a noise absorbing member used in the present invention is produced, land portions 2a and continuous grooves 2b should be formed to have identical cross-sectional shapes to each other as exemplified in FIG. 8. Specifically, FIG. 8 shows a case where an outer peripheral surface 2z is formed in which the land portions 2a and the continuous grooves 2b are provided respectively above and below a central line 2p of noise absorbing members 2 in a thickness direction thereof. By forming the land portions 2a and the continuous grooves 2b to have the identical forms in this manner, the two noise absorbing members 2 having the identical forms are formed simultaneously.

Figure 9:
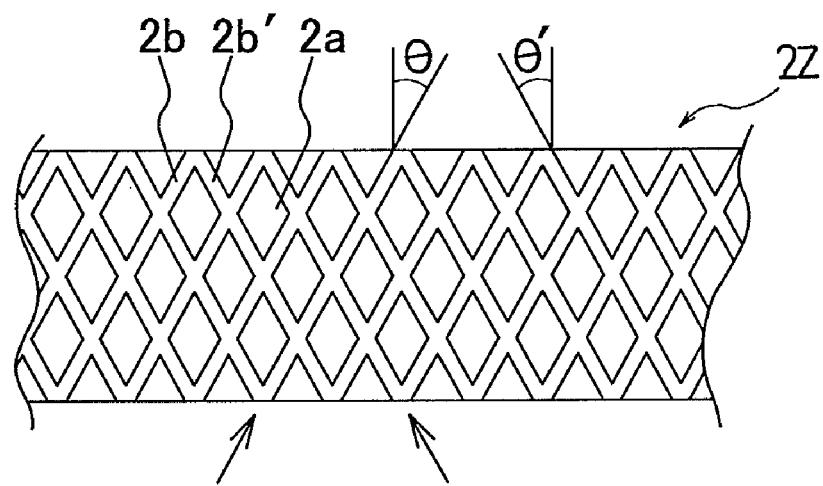
FIG. 9 is a plan view showing a noise absorbing member according to still another embodiment of the present invention, corresponding to FIG. 4.

The tire noise reduction device of the present invention may have other continuous grooves 2b', as shown in FIG. 9, in addition to the multiple continuous grooves 2b which extends at the angle θ. The other continuous grooves 2b' have a different extending direction from that of the continuous grooves 2b. The extending direction of the other continuous groove 2b' is not particularly limited. Examples of the extending direction include the tire circumferential direction, the tire width direction, and an opposite inclined direction to that of the continuous grooves 2b. The magnitude of an inclined angle θ' of the other continuous groove 2b' may be the same as or different from that of the inclined angle θ of the continuous groove 2b; however, the inclined angle θ' is 0° to 90° to the tire width direction, and preferably 0° to 30°. These other continuous grooves 2b' cross the continuous grooves 2b in the outer peripheral surface 2Z of the noise absorbing member. Thereby, a block-form land portion 2a' is defined by the continuous grooves 2b, 2b and the other continuous grooves 2b', 2b'. The outer peripheral surface of the block-form land portion 2a' comes into contact with the inner surface of the tread portion.

Figure 10:
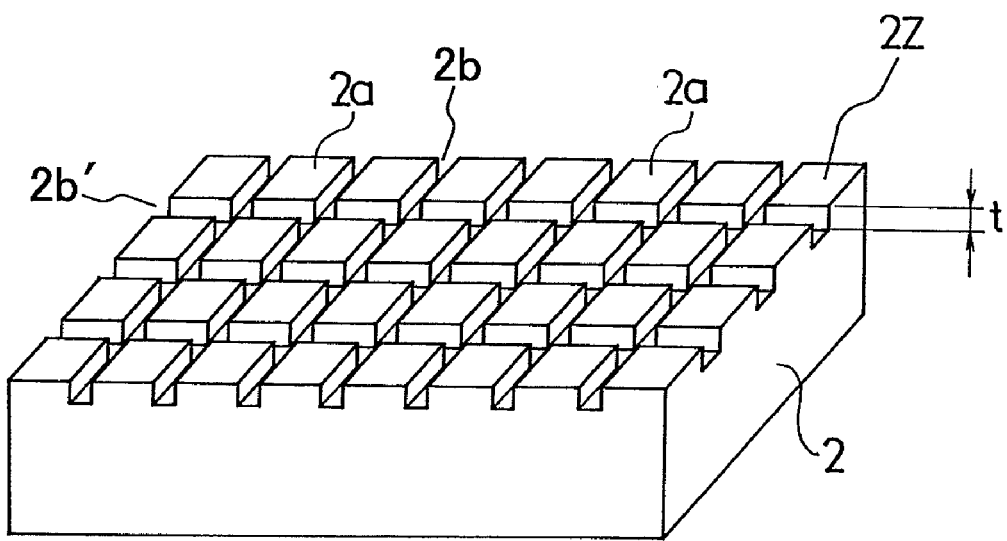
FIG. 10 is a perspective view showing still another embodiment of the noise absorbing member used in present invention, corresponding to FIG. 3.
Figure 11:
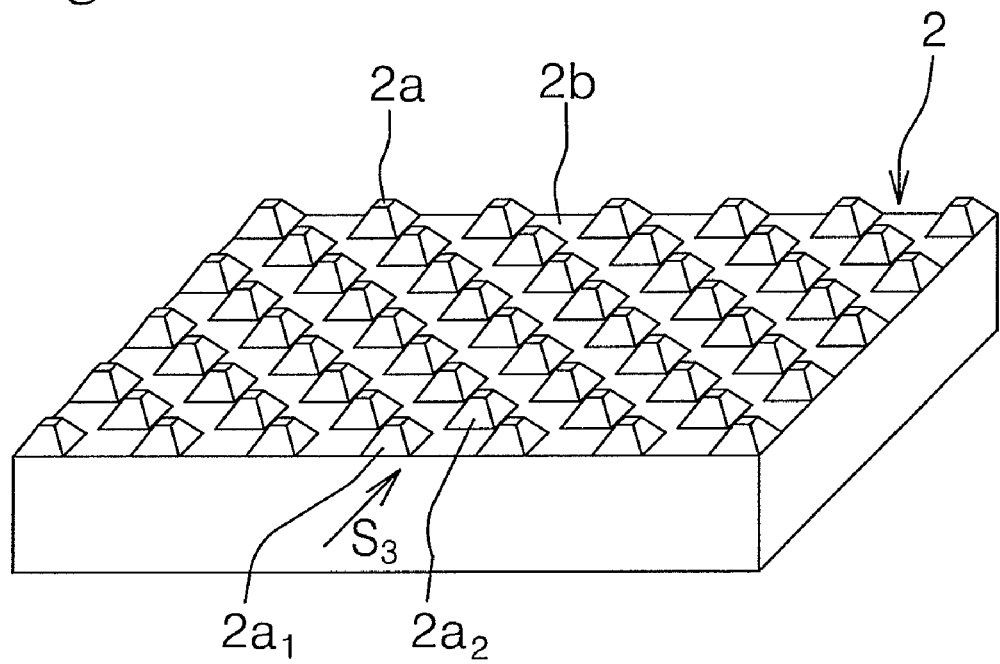
FIG. 11 is a perspective view showing still another embodiment of the noise absorbing member used in the present invention, corresponding to FIG. 3.

Additionally, the other continuous grooves 2b' can be extended not only transversely across the noise absorbing member as shown in FIG. 9, but also extended substantially in the tire circumferential direction as shown in FIGS. 10 and 11. Here, the "substantially in the tire circumferential direction" means that the other continuous grooves 2b' each have an angle of ±5° to the tire circumferential direction. In FIG. 10, continuous grooves 2b and continuous grooves 2b' extend in the tire width direction and in the tire circumferential direction, respectively. Thereby, block-form land portions 2a' are formed into polygonal columns (quadrangle columns in the drawing).

Figure 12:
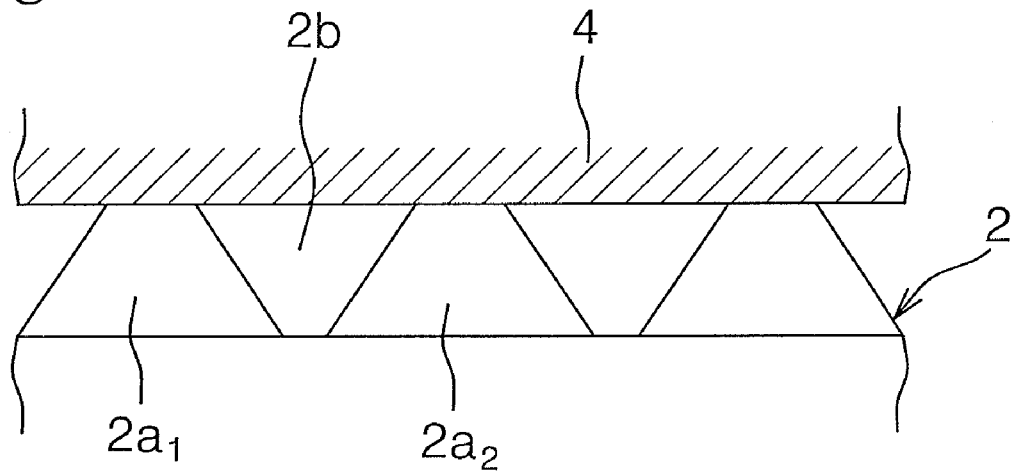
FIG. 12 is an enlarged side view showing a continuous groove portion of the noise absorbing member in FIG. 11, the noise absorbing member being attached to the inner surface of a tread portion.

Meanwhile, in FIG. 11, block-form land portions 2a' are formed into polygonal frustums (quadrangle frustums in the drawing). Moreover, the block-form land portions 2a' are removed alternately so as to form a so-called checker board design. By forming the block-form land portions 2a' into the polygonal frustums, the compression rigidity of the land portions is retained, and the noise absorbing member is stably attached. In addition, the volume of the continuous spaces is increased, and the liquid tire sealant 6 is allowed to flow further smoothly. Furthermore, when the noise absorbing member, in FIG. 11, attached to the inner surface of the tread portion 4 is viewed in a direction indicated by an arrow $S_3$, a continuous groove 2b enlarged in FIG. 12 forms a see-through region in a space between block-form land portions $2a_1$, $2a_2$ as shown in FIG. 12.

As shown in FIGS. 10 and 11, when the block-form land portions 2a' are formed on the outer peripheral surface of the noise absorbing member, the arrangement density of the block-form land portions 2a' is preferably 400/m$^2$ to 80000/m$^2$, and more preferably 800/m$^2$ to 50000/m$^2$. If the arrangement density of the block-form land portions 2a' is less than 400/m$^2$, the size of the block-form land portions 2a' is excessively increased, and the interval between the continuous grooves 2b is increased. Accordingly, it is difficult for a liquid tire sealant to reach the center of the block-form land portions 2a'. Meanwhile, if the arrangement density of the block-form land portions 2a' exceeds 80000/m$^2$, the size of the block-form land portions 2a' is decreased, making the processing difficult.

Water repellent finishing should be performed on the noise absorbing member 2, at least the outer peripheral surface thereof. Thereby, the weathering resistance of the noise absorbing member 2 is retained, and thus the noise absorbing member 2 is prevented from deterioration at an early stage. Moreover, by reducing the amount of the liquid tire sealant 6 impregnated into the noise absorbing member 2 as much as possible, the liquid tire sealant 6 is allowed to flow into the continuous spaces on the outer peripheral side of the noise absorbing member 2 readily, and the through hole (A) is sealed further efficiently.

The water repellent finishing should be performed by adding a water repellent to the porous material for forming the noise absorbing member 2. Examples of the water repellent include waxes, metal soaps, alkylpyridinium halides, silicone, fluorides, and the like. When the noise absorbing member 2 is made of a foamed polyurethane resin, the water repellent may be blended with the noise absorbing member 2 at the time of production (at the time of foaming).

The porous material for forming the noise absorbing member is preferably a resin foam. Particularly preferable is a low-density polyurethane foam, since the low-density polyurethane foam has a resistance so that it may be hardly compressed and deformed by the tire inflation pressure. The bubbles in the foam are preferably continuous. On the other hand, the porous material may be formed of felt obtained by binding fibers, a woven fabric and a non-woven fabric such as a mat, or the like, other than the resin foam.

The noise absorbing member used in the present invention preferably has an apparent density of 5 kg/m$^3$ to 30 kg/m$^3$, and more preferably 10 kg/m$^3$ to 27 kg/m$^3$. If the apparent density is lower than 5 kg/m$^3$, the compression rigidity is lowered, and the land portions are crushed by the centrifugal force. Accordingly, no continuous spaces are formed at the time of low-speed running. Meanwhile, if the apparent density exceeds 30 kg/m$^3$, the mass of the noise absorbing member is increased, and the mass balance is worsened during the tire-rolling motion in some cases. Incidentally, the apparent density of the noise absorbing member was measured according to JIS K6400.

Each tire noise reduction device 1 shown in FIGS. 3, 10 and 11 can be mounted so as to be bonded to the inner surface of the tread portion 4 of the tire by the elastic force of the noise absorbing member 2. Besides this mounting method, the outer peripheral surface 2Z of the noise absorbing member 2 may be fixed to the inner surface of the tread portion 4 with an adhesive and the like. By causing the outer peripheral surface 2Z of the noise absorbing member 2 to adhere to the inner surface of the tread portion 4, the stability of the tire noise reduction device 1 on the inner surface of the tread portion 4 is retained, improving the tire uniformity and simultaneously improving the durability of the tire noise reduction device 1.

Figure 13:
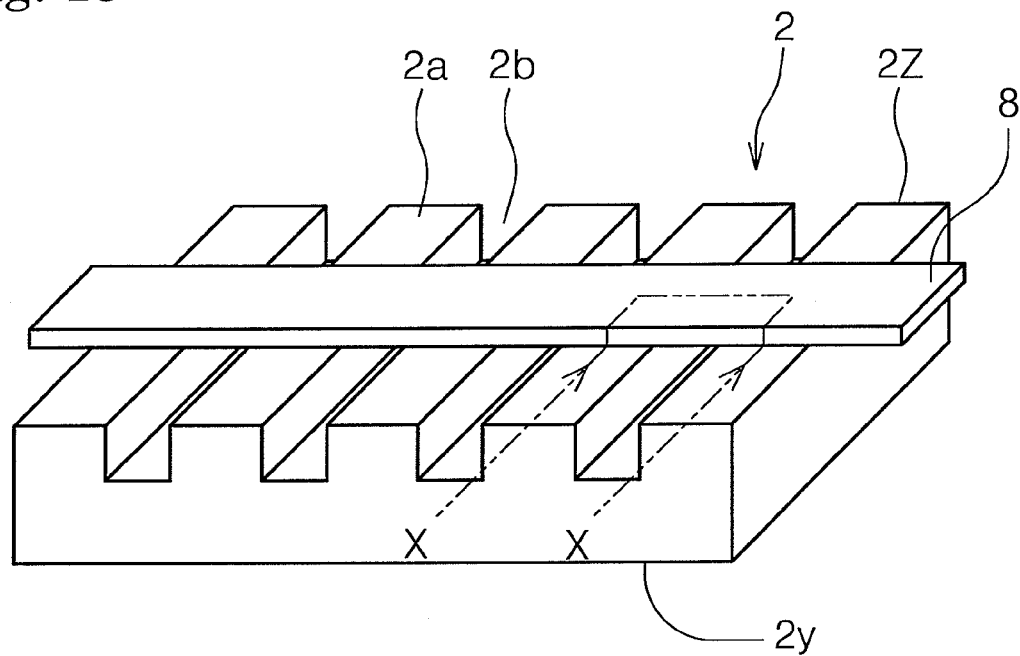
FIG. 13 is a perspective view showing a tire noise reduction device according to still another embodiment of the present invention, corresponding to FIG. 3.
Figure 14:
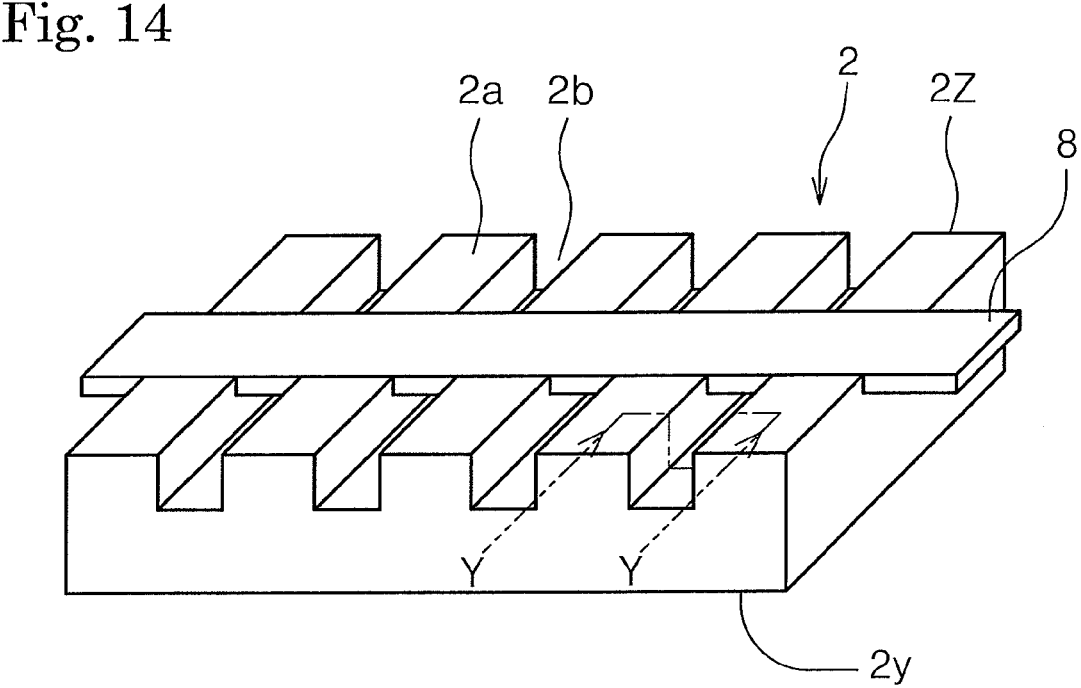
FIG. 14 is a perspective view showing a tire noise reduction device according to still another embodiment of the present invention, corresponding to FIG. 3.

Furthermore, as shown in FIGS. 13 and 14, an annular elastic band 8 may be attached to the noise absorbing member 2 so that the tire noise reduction device 1 may be bonded to the inner surface of the tread portion 4 by the elastic force of this elastic band 8. In FIG. 13, an elastic band 8 is attached to the top portions of the central regions, in the tire width direction, of the land portions 2a in the outer peripheral surface 2Z of the noise absorbing member 2. Moreover, in FIG. 14, concave portions are formed in the central regions, in the tire width direction, of the land portions 2a in the outer peripheral surface 2Z of the noise absorbing member 2. An elastic band 8 is fitted into the concave portions, and is attached to the land portions 2a so that both the elastic band 8 and the land portions 2a may be formed in the same outer peripheral surface. By using the elastic band 8 in such a manner, the detachment operation of the tire noise reduction device 1 is simplified, while the noise absorbing member 2 and the elastic band 8 surely adhere to each other. Incidentally, in the examples shown in FIGS. 13 and 14, the annular elastic band 8 is attached to the side of the outer peripheral surface 2Z of the noise absorbing member 2, but the elastic band 8 can be attached to the side of the inner peripheral surface.

Figure 15:
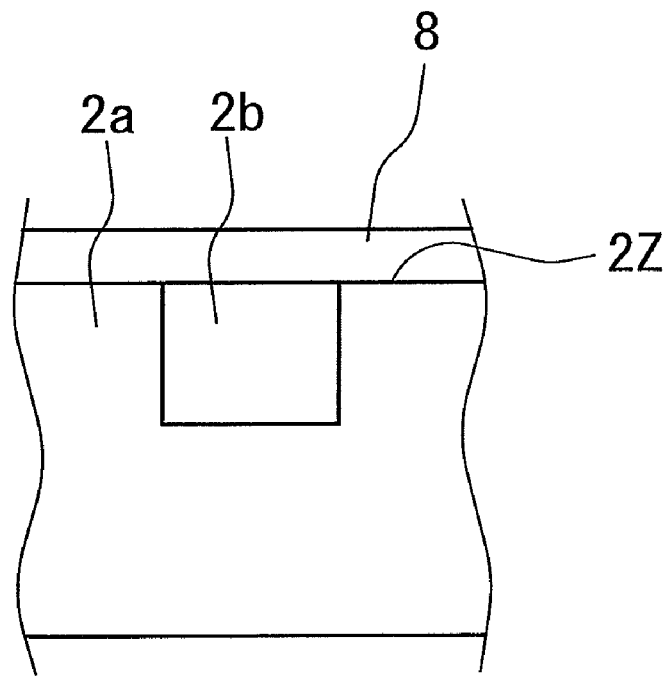
FIG. 15 is a cross-sectional view of the tire noise reduction device in FIG. 13 as viewed from the arrows X-X.
Figure 16:
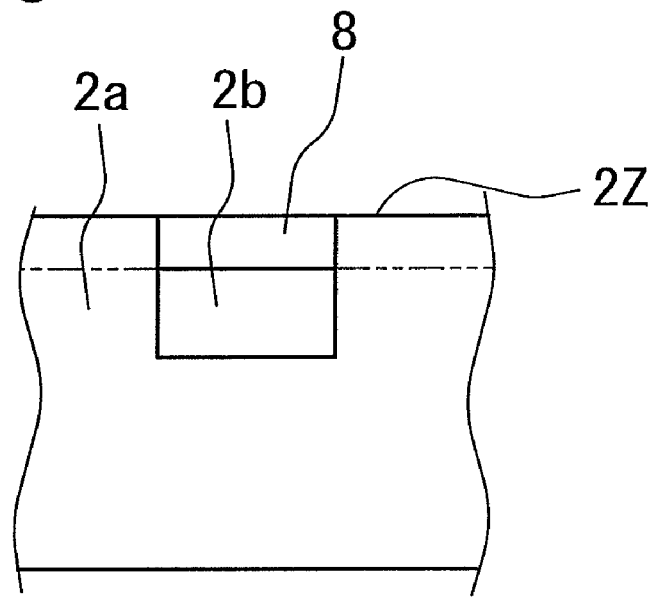
FIG. 16 is a cross-sectional view of the tire noise reduction device in FIG. 14 as viewed from the arrows Y-Y.

In each tire noise reduction device shown in FIGS. 13 and 14, the see-through cross-sectional area of the continuous groove 2b formed in the outer peripheral surface 2Z of the noise absorbing member 2 is a cross-sectional area of a region surrounded by the inner peripheral surface of the elastic band 8 as well as the groove bottom and both side surfaces of the continuous groove 2b as shown in FIGS. 15 and 16, respectively. When the elastic band 8 is attached to the outer peripheral surface 2Z of the noise absorbing member 2, the area where the outer peripheral surface 2Z of the noise absorbing member 2 is in contact with the inner surface of the tread portion 4 is defined by subtracting the projected area of the elastic band 8 from the projected area of the noise absorbing member 2. Incidentally, the projected areas of the noise absorbing member 2 and the elastic band 8 were obtained according to the aforementioned method.

Figure 17:
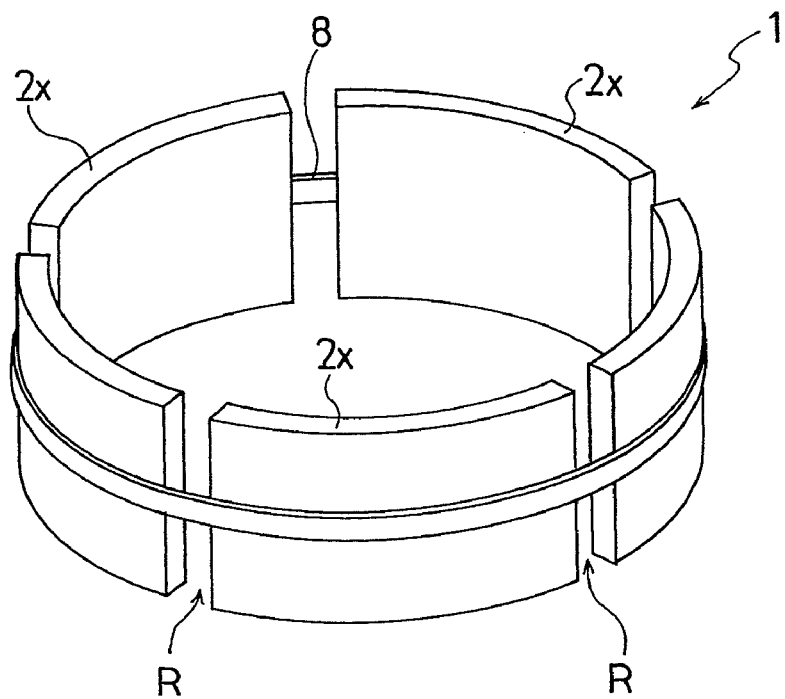
FIG. 17 is a perspective view showing an overview of a tire noise reduction device according to still another embodiment of the present invention.

Furthermore, a noise absorbing member 2 may include multiple divided parts as shown in FIG. 17. These multiple divided parts 2x are arranged apart from one another at certain intervals in the tire circumferential direction. Thereby, interspaces R extending in the tire width direction are formed intermittently between each adjacent two of the divided parts 2x in the tire circumferential direction. A liquid tire sealant 6 can flow along the interspaces R, enabling the liquid tire sealant 6 to flow in the tire width direction further smoothly. Thus, a through hole (A) is sealed further efficiently. Incidentally, although multiple continuous grooves are arranged in the outer peripheral surface of the noise absorbing member 2, the illustration is omitted in FIG. 17 to simplify the drawing.

The material of the elastic band 8 is not particularly limited, but may be a rubber or resin. The Young's modulus of the material is preferably within a range of 300 MPa to 3000 MPa, and more preferably 500 MPa to 2000 MPa. Thereby, the position of the tire noise reduction device is stabilized on the inner surface of the tread portion 4, and a preferable uniformity is retained. If the Young's modulus is less than 300 MPa, the uniformity may be reduced. Meanwhile, if the Young's modulus exceeds 3000 MPa, the tire noise reduction device 1 cannot deform in accordance with the flexed deformation of the tire, and the Young's modulus may cause the durability to be deteriorated.

The pneumatic tire 3 of the present invention includes the above-described tire noise reduction device 1 mounted on the inner surface of the tread portion 4. While retaining its durability, the pneumatic tire 3 thus structured allows rapid and reliable tire sealing when the through hole (A) is formed in the tread portion 4 by running over a nail or the like. Specifically, in the pneumatic tire 3, the liquid tire sealant 6 poured through the air injection valve is distributed to the inner surface of the tread portion 4, and readily flows into the through hole (A).

The tire noise reduction device 1 of the present invention improves the operability at the time of tire sealing operation by including the multiple continuous grooves arranged in the outer peripheral surface of the noise absorbing member 2 made of the porous material so that one side of the noise absorbing member 2 can be seen through the continuous groove from the opposite side, while suppressing the increase in the tire weight. Therefore, the pneumatic tire 3 including the tire noise reduction device 1 mounted on the inner surface of the tread portion 4 demonstrates a rapid and reliable sealing function against the through hole (A) formed by running over a nail or the like. Moreover, the pneumatic tire 3 can be widely employed in a vehicle that does not carry a spare tire.

EXAMPLES

Figure 18:
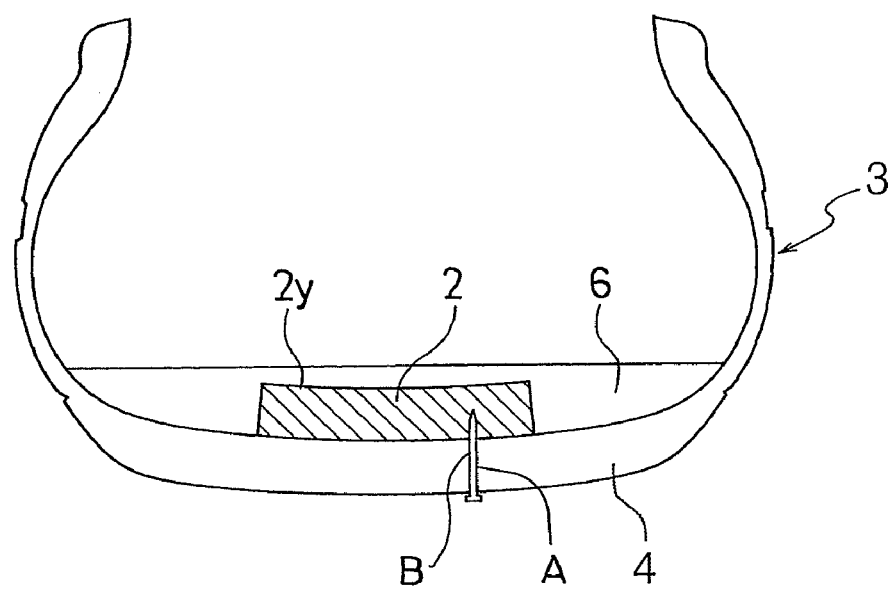
FIG. 18 is a cross-sectional view showing a state where a liquid tire sealant is poured into a pneumatic tire on which a conventional tire noise reduction device is mounted.

Eight types of pneumatic tires (Examples 1 to 5 and Comparative Examples 1 to 3) were prepared. Each of the pneumatic tires had a tire size of 215/60R16 and included a noise absorbing member attached to the inner surface of a tire tread portion all around, in common. The noise absorbing member was made of a foamed polyurethane (having an apparent density of 18 kg/m$^3$) and had a width of 180 mm and a thickness of 20 mm. However, the noise absorbing member of each pneumatic tire had a different form from those of the others. In the tire of Comparative Example 1, a tire noise reduction device included the noise absorbing member with a flat outer peripheral surface as shown in FIG. 18. In each tire of Examples 1, 2 and Comparative Examples 2, 3, the noise absorbing member included multiple straight continuous grooves having rectangular cross-sections in the outer peripheral surface thereof in common. However, the tires of Examples 1, 2 and Comparative Examples 2, 3 differed from one another in terms of: a shape of the continuous groove; a groove edge-to-edge distance (h) (mm); a largest see-through cross-sectional area (mm$^2$); a depth (t) (mm) of the continuous groove; a width (w) (mm) of the continuous groove; an angle θ (°) of the see-through-region extending direction, which is specified by the largest see-through cross-sectional area, to the tire width direction; and a proportion of the area where the noise absorbing member came into contact with the inner surface of the tread portion to a projected area of the noise absorbing member ("contact area proportion" in the table), as shown in Table 1.

Moreover, each tire of Examples 3 to 5 included the noise absorbing member which had the same material and external dimension as those in Comparative Example 1. Additionally, in Examples 3 to 5, multiple continuous grooves extending in the tire width direction and other continuous grooves extending in the tire circumferential direction were arranged straightly in the outer peripheral surface of the noise absorbing member in common. However, the tires in Examples 3 to 5 differed from one another in terms of: a shape of the continuous groove, a groove edge-to-edge distance (h) (mm); a largest see-through cross-sectional area (mm$^2$); a depth (t) (mm) of the continuous groove; a width (w) (mm) of the continuous groove; a contact area proportion; and an arrangement density (the number per m$^2$), as shown in Table 2.

Each of these eight types of tires was inflated to an air pressure of 210 kPa. A nail with a length of 30 mm was put in the central position, in the tire width direction, of the tread portion. Then, a liquid tire sealant (700 cc) was poured through an air injection valve. After 10-minute running at 30 km/h, whether or not any air leakage had occurred was checked by air-pressure measurement. This test was performed on five tires of each tire type. The number of tires having no air leakage checked is recorded in Tables 1 and 2.

TABLE 1

| | | Comparative Example 1 | Comparative Example 2 | Comparative Example 3 | Example 1 | Example 2 |
|---|---|---|---|---|---|---|
| Form of outer peripheral surface | Shape of continuous groove | Flat | FIG. 3 | FIG. 3 | FIG. 3 | FIG. 4 |
| | Groove edge-to-edge distance (h) [mm] | — | 60 | 10 | 10 | 10 |
| | Largest see-through cross-sectional area [mm$^2$] | — | 20 | 15 | 25 | 20 |
| | Groove depth (t) [mm] | — | 5 | 10 | 5 | 10 |
| | Groove width (w) [mm] | — | 4 | 1.5 | 5 | 2 |
| | Angle θ [°] | — | 0 | 0 | 0 | 20 |
| | Contact area proportion [%] | — | 93.8 | 87.0 | 66.7 | 83.3 |
| Number of tires without air leakage [number] | | 1 | 1 | 1 | 5 | 4 |

TABLE 2

| | | Example 3 | Example 4 | Example 5 |
|---|---|---|---|---|
| Form of outer peripheral surface | Shape of continuous groove | FIG. 11 | FIG. 10 | FIG. 10 |
| | Groove edge-to-edge distance (h) [mm] | 20 | 25 | 10 |
| | Largest see-through cross-sectional area [mm$^2$] | 20 | 65 | 26 |
| | Groove depth (t) [mm] | 5 | 8 | 8 |
| | Groove width (w) [mm] | 4 | 10 | 4 |
| | Contact area proportion [%] | 69.4 | 25.5 | 25.5 |
| | Arrangement density (number/m$^2$) | 1736 | 408 | 2551 |
| Number of tires without air leakage [number] | | 5 | 5 | 5 |

What is claimed is:

1. A tire noise reduction device attached to a tire comprising:

at least one noise absorbing member which is made of a porous material and attached to an inner surface of a tire tread portion, wherein the noise absorbing member includes a plurality of continuous grooves arranged side by side in a tire circumferential direction in an outer peripheral surface of the noise absorbing member, each of the continuous grooves has an areal groove bottom and extends from one side surface to an opposite side surface of the noise absorbing member in a tire width direction so that one side can be seen through the continuous groove from the opposite side, a groove edge-to-edge distance between each adjacent two of the continuous grooves in the tire circumferential direction is 2 mm to 40 mm, and a largest see-through cross-sectional area of each of the continuous grooves is 20 mm$^2$ to 100 mm$^2$.

2. The tire noise reduction device according to claim 1, wherein
water repellent finishing is performed on at least the outer peripheral surface of the noise absorbing member.

3. The tire noise reduction device according to claim 1, wherein
the noise absorbing member has an apparent density of 5 kg/m³ to 30 kg/m³.

4. The tire noise reduction device according to claim 1, wherein
each of the continuous grooves has a depth of 1 mm to 10 mm.

5. The tire noise reduction device according to claim 1, wherein
each of the continuous grooves has a width of 2 mm to 30 mm.

6. The tire noise reduction device according to claim 1, wherein
a see-through-region extending direction specified by the largest see-through cross-sectional area of the continuous grooves is inclined at 0° to 30° to the tire width direction.

7. The tire noise reduction device according to claim 1, wherein
other continuous grooves are formed to cross the continuous grooves, and
the continuous grooves and the other continuous grooves define block-form land portions.

8. The tire noise reduction device according to claim 7, wherein
the other continuous grooves extend substantially in the tire circumferential direction.

9. The tire noise reduction device according to claim 7, wherein
the number of the block-form land portions is 400/m² to 80000/m².

10. The tire noise reduction device according to claim 1, wherein
the area where the outer peripheral surface of the noise absorbing member is in contact with the inner surface of the tread portion is 20% to 90% of a projected area of the noise absorbing member that is projected in a tire radial direction.

11. The tire noise reduction device according to claim 7, wherein
the area where the outer peripheral surface of the noise absorbing member is in contact with the inner surface of the tread portion is 20% to 90% of a projected area of the noise absorbing member that is projected in a tire radial direction.

12. The tire noise reduction device according to claim 1, further comprising
an annular elastic band attached to the noise absorbing member for attaching the noise absorbing member to the inner surface of the tire tread portion.

13. The tire noise reduction device according to claim 7, further comprising
an annular elastic band attached to the noise absorbing member for attaching the noise absorbing member to the inner surface of the tire tread portion.

14. The tire noise reduction device according to claim 12, wherein
the noise absorbing member includes multiple divided parts, and
the divided parts are arranged at certain intervals in the tire circumferential direction.

15. The tire noise reduction device according to claim 13, wherein
the noise absorbing member includes multiple divided parts, and
the divided parts are arranged at certain intervals in the tire circumferential direction.

16. A pneumatic tire comprising:
the tire noise reduction device according to claim 1, the tire noise reduction device mounted on an inner surface of a tread portion of the tire.

17. A pneumatic tire comprising:
the tire noise reduction device according to claim 12, the tire noise reduction device mounted on an inner surface of a tread portion of the tire.

18. A pneumatic tire comprising:
the tire noise reduction device according to claim 1; and
an adhesive with which the tire noise reduction device is fixed to an inner surface of a tread portion of the tire.

* * * * *